United States Patent
Hoshikawa et al.

[19]

[11] Patent Number: 6,065,315
[45] Date of Patent: May 23, 2000

[54] VEHICLE DOOR LATCH DEVICE AND METHOD OF CONTROLLING THEREOF

[75] Inventors: Tsuguo Hoshikawa; Hisashi Inoue, both of Yamanashi-ken, Japan

[73] Assignee: Mitsui Kinzoku Kogyo Kabushiki Kaisha, Tokyo, Japan

[21] Appl. No.: 08/651,704

[22] Filed: May 21, 1996

Related U.S. Application Data

[63] Continuation-in-part of application No. 08/341,116, Nov. 18, 1994, Pat. No. 5,538,298.

[30] Foreign Application Priority Data

May 31, 1995 [JP] Japan ................................. 7-157238

[51] Int. Cl.[7] .................................................... E05B 65/36
[52] U.S. Cl. .............................. 70/264; 70/277; 292/201; 307/10.2
[58] Field of Search ..................... 70/264, 277; 292/201; 307/10.2; 318/362–382

[56] References Cited

U.S. PATENT DOCUMENTS

| | | | |
|---|---|---|---|
| 4,364,249 | 12/1982 | Kleefeldt | ................................... 70/264 |
| 4,454,776 | 6/1984 | Barge | ................................. 292/201 X |
| 5,054,300 | 10/1991 | Nakahara et al. | ..................... 70/264 X |
| 5,419,596 | 5/1995 | Okada et al. | ............................. 292/201 |
| 5,534,846 | 7/1996 | Kuroda | ................................. 70/264 X |
| 5,603,537 | 2/1997 | Amano et al. | ......................... 70/264 X |

FOREIGN PATENT DOCUMENTS

| 2278396 | 11/1994 | United Kingdom . |
|---|---|---|
| 2279400 | 1/1995 | United Kingdom . |

*Primary Examiner*—Lloyd A. Gall
*Attorney, Agent, or Firm*—Browdy and Neimark

[57] ABSTRACT

A vehicle door latch device comprises a locking lever displaceable between locked and unlocked positions, an antitheft member displaceable between an antitheft position for disabling an unlocking operation of an inside locking button and an antitheft cancelling position, a motor for changing the locking lever into the locked position by a predetermined amount of normal rotation thereof and for changing the antitheft member into the antitheft position by a continuous normal rotation thereof beyond the predetermined amount, a controller for carrying out a locking operation and an antitheft operation, and a power supplying circuit having a normal rotation circuit for supplying power to the motor for normal rotation and a brake circuit for causing the motor to generate electrical brake. The motor is connected to the brake circuit after the locking lever is changed into the locked position by the locking operation.

7 Claims, 7 Drawing Sheets

VEHICLE DOOR LATCH DEVICE AND METHOD OF CONTROLLING THEREOF

CROSS REFERENCE TO RELATED APPLICATIONS

This application is a continuation-in-part of Ser. No. 08/341,116, filed Nov. 18, 1994 now U.S. Pat. No. 5,538,298.

BACKGROUND OF THE INVENTION

This invention relates to a vehicle door latch device provided with an antitheft mechanism providing enhanced protection against criminal activity and a control method therefor.

PRIOR ART OF THE INVENTION

A well-known door latch device has a latch unit attached to each of doors of a vehicle. The latch unit can be put into a locked condition by displacing a locking lever to a locked position from an unlocked position by manipulation of a door key cylinder and/or an inside locking button. Further, it is also well known that the locked condition of such a general latch unit can illegally be cancelled without a door key, by inserting a gripping tool into a vehicle through a gap between a vehicle door and a vehicle body so as to change the position of an inside locking button into an unlocked position. Thus, the antitheft characteristic ability of a general latch unit is not high.

There have been proposed several kinds of antitheft mechanisms for disabling such an illegal operation. Each of these antitheft mechanisms has an antitheft member which is changed over between an antitheft position for disconnecting an inside locking button from a locking lever and an antitheft cancelling position for connecting the inside locking button with the locking lever. Thus, at an antitheft condition, the locking lever cannot be changed into the unlocked position even though the inside locking button is manipulated.

Further, it is also well known that the latch unit has an actuator by which a locking lever and an antitheft member are displaced.

FIG. 10 is a schematic view for explaining operations of changing the positions of a locking lever C and an antitheft member E. An actuator has a motor M, an output member A rotated by the motor M, and a spring B for holding the output member A at a neutral position. The locking lever C is held by the resilient force of a spring D in either a locked position or an unlocked position, and the antitheft member E is held by the resilient force of a spring F in an antitheft position or an antitheft cancelling position. If the output member A is turned by motor M from the neutral position to a locking point G against the resilient force of the spring B, the locking lever C is changed into the locked position. If the output member A is turned to an antitheft point H beyond the locking point G, the antitheft member E is changed into the antitheft position. Further, if the output member A is reversed to an unlocking point J, the locking lever C returns to the unlocked position and the antitheft member E also returns to the antitheft cancelling position.

In the case of the mechanism shown in FIG. 10, the output member A turned by the motor M may rotate excessively after the energizing of the motor M is stopped. Then, the output member A is returned to the neutral position by the resilient force of the spring B. Sometimes, the surplus rotation in excess undesirably changes the antitheft member E into the antitheft position. Thus, it is desirable to make the surplus rotation as small as possible. However, the amount of surplus rotation of the output member A changes with a variation in the frictional resistance of components of the latch unit or in the voltage of a battery serving as a power source for the motor M. Accordingly, the adjustment of the timing at which the energizing of the motor M is stopped has been extremely difficult.

Further, timing of the change-over of each locking lever of the latch units into the locked position are not synchronized with each other. Therefore, the adjustment of the timing at which the energizing of the motor M is stopped becomes more difficult.

SUMMARY OF THE INVENTION

An object of the present invention is to reduce the amount of surplus rotation of the output member (or motor) of the actuator attached to the latch unit to a negligible value.

Further, another object of the present invention is to provide a door latch device in which the amounts of surplus rotation of a plurality of actuators attached respectively to a plurality of latch units are set to be substantially identical.

DESCRIPTION OF THE PREFERRED EMBODIMENTS

Figure 1:
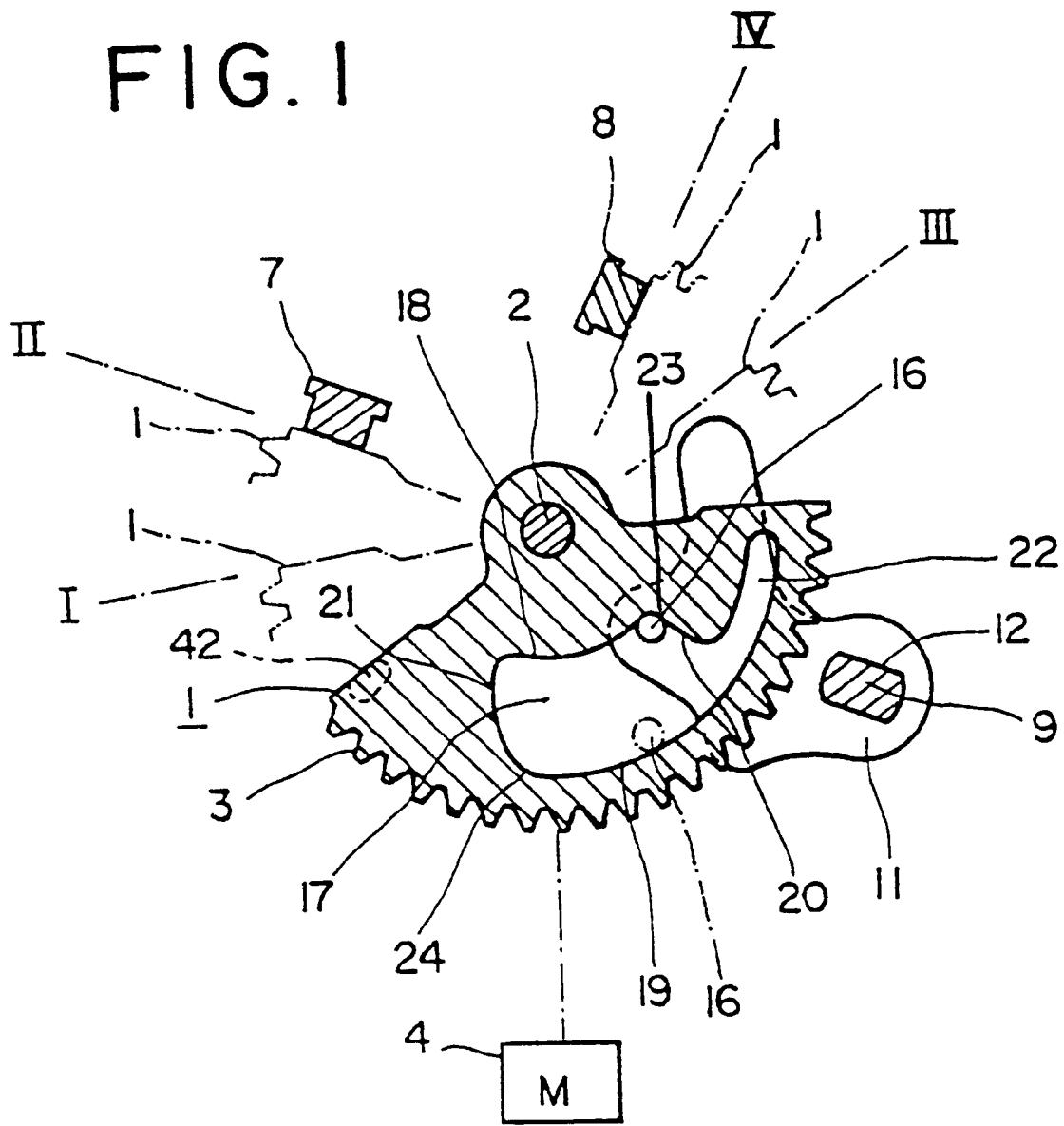
FIG. 1 is a schematic view illustrating an actuator attached to a latch unit, according to the present invention.
Figure 2:
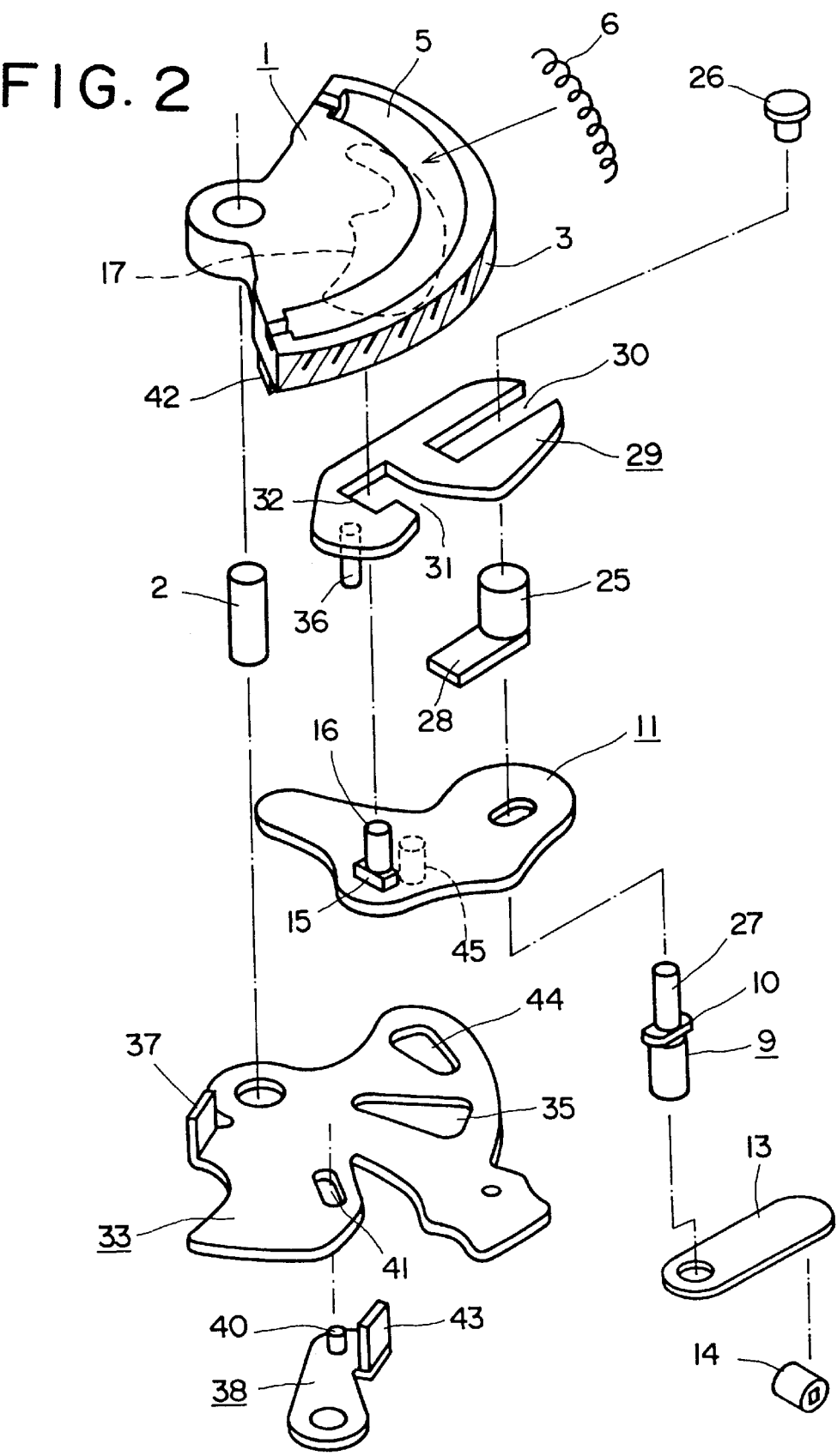
FIG. 2 is an exploded perspective view illustrating the actuator as shown in FIG. 1.

Hereinafter, a preferred embodiment of the present invention will be described in detail by referring to the accompanying drawings. FIG. 1 is a diagram schematically showing an actuator which is attached to a well-known latch unit of a vehicle door latch device. The actuator comprises a sector-like output member 1 rotatably journalled to a shaft 2. The output member 1 has a gear portion 3 on the periphery thereof, which meshes with an output gear (not shown) of a motor 4. As best shown in FIG. 2, a return spring 6 is enclosed in an arcuate groove 5 which is formed in the upper surface of the output member 1 around the shaft 2.

The output member 1 is held at a neutral position as indicated by the solid lines and curves in FIG. 1 by the elasticity of the spring 6 when the motor 4 is not energized. The output member 1 can be turned clockwise from the neutral position through a locking point I to an antitheft point II (hereunder often referred to as an AT point) where the member 1 is put into abutting engagement with a rubber stopper 7, when the motor 4 is normally rotated. Conversely, when the motor 4 is reversed, the output member 1 can be turned counterclockwise from the neutral position through an antitheft cancelling point III (hereunder often referred to as an AT cancelling point) to an unlocking point IV where the member 1 is put into abutting engagement with a rubber stopper 8.

A first shaft 9 provided in the vicinity of the output member 1 has an engaging part 10 which is engaged in a hole 12 formed in a first lever 11. The first shaft 9 is connected at its lower end to a well-known locking lever 13 of the latch unit which is displaceable between a locked position and an unlocked position by manipulating a door key cylinder 14 or the like. The locking lever 13 and the first lever 11 are integrally connected with each other. Thus, FIGS. 3 to 8 are simplified by omitting the locking lever 13.

A box-like member 15 and a pole 16 projected upward from the top part of the box-like member 15 are provided on the upper surface of the first lever 11. An upper part of the pole 16 is located in a cam recess 17 formed in the lower surface of the output member 1. When the output member 1 is turned from the neutral position clockwise or counterclockwise, the cam recess 17 comes into contact with the pole 16 so that the first lever 11 is turned about the first shaft 9 as a rotational center.

The cam recess 17 has an inner arcuate wall 18, an outer arcuate wall 19, a right cam wall 20 and a left cam wall 21. The inner and outer walls 18 and 19 are formed in an arcuate shape having the center shaft 2 as its center. A free play recess 22 extending along an arcuate locus centered at the shaft 2 is formed in the crossing part between the outer arcuate wall 19 and the right cam wall 20.

Figure 4:
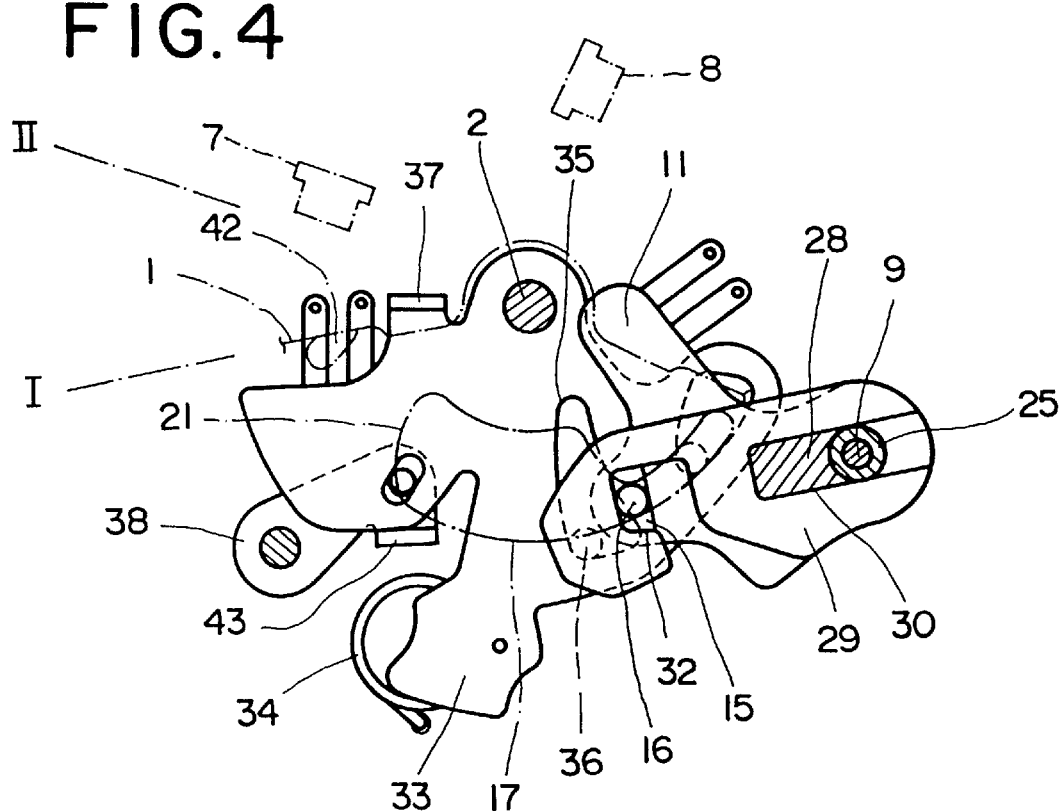
FIG. 4 is a view illustrating the output member which has been rotated to a locking point I from a condition shown in FIG. 3.

Explanation will be made in detail of the relationship between the cam recess 17 and the first lever 11 which is displaced integrally with the lock lever 13 with reference to FIG. 1. The first lever 11 as shown in FIG. 1 is located at the unlocked position and the pole 16 of the first lever 11 is located at a first corner 23 between the inner arcuate wall 18 and the right cam wall 20. In this condition, when the output member 1 is turned clockwise by the motor 4 to the locking point I, the right cam wall 20 pushes the pole 16 to thereby turn the first lever 11 counterclockwise. Thus, the first lever 11 (and the locking lever 13) is displaced to the locked position and the latch unit is changed into a locked condition. The pole 16 at the locked position is indicated by the phantom line. FIG. 4 illustrates a state of the actuator in which the output member 1 is turned to the locking point I.

Figure 5:
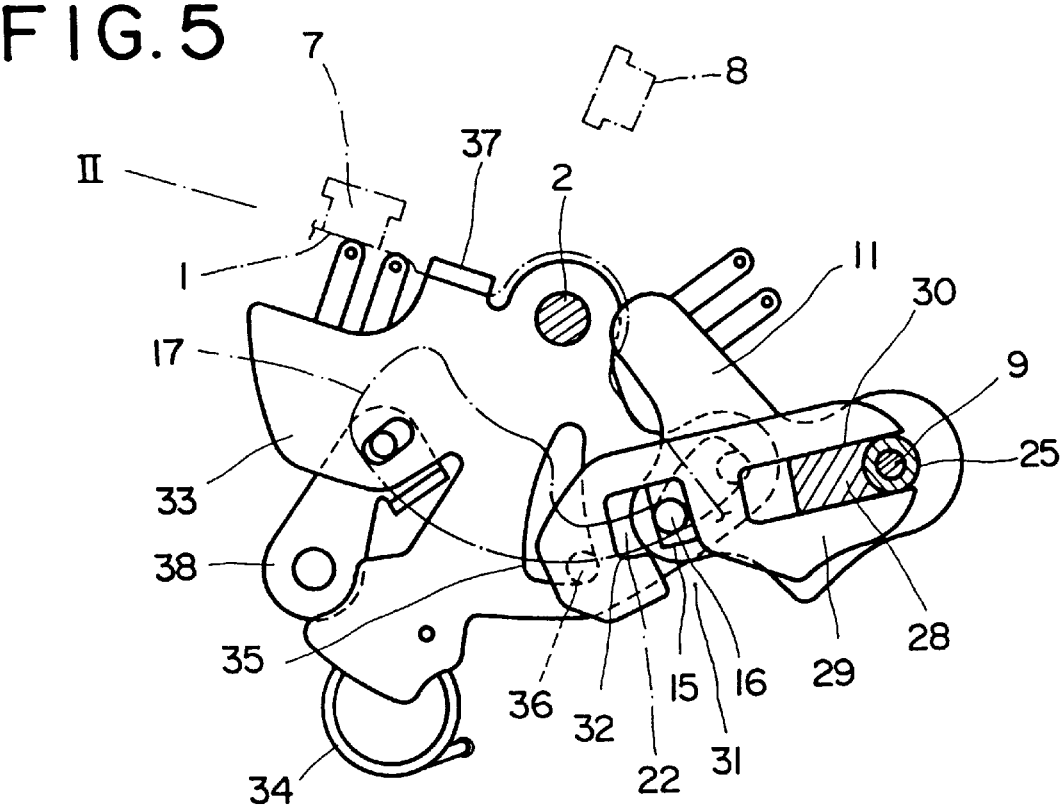
FIG. 5 is a view illustrating the output member which has been rotated to an antitheft point II from a condition show in FIG. 4.

Further, when the output member 1 is turned clockwise to the AT point II beyond the locking point I, the pole 16 having been in the locked position enters into the free play recess 22 as shown in FIG. 5.

Figure 7:
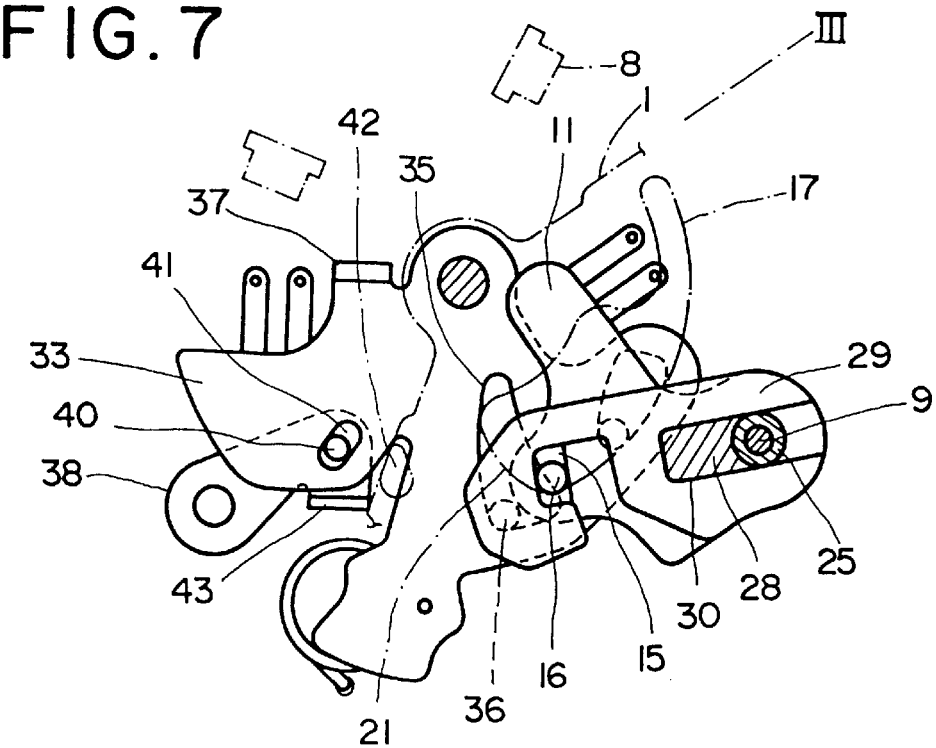
FIG. 7 is a view illustrating the output member which has been turned to an antitheft cancelling point III from a condition shown in FIG. 6.
Figure 8:
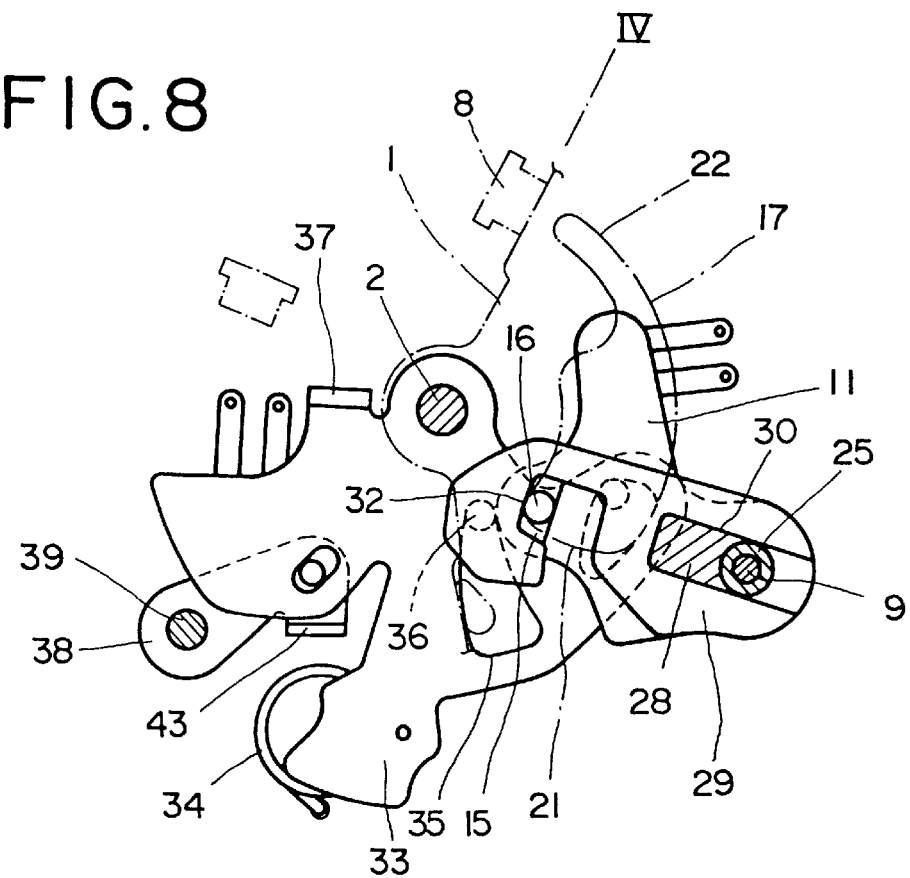
FIG. 8 is a view illustrating the output member which has been turned to an unlocking point IV from a condition shown in FIG. 7.

When the output member 1 is located at the neutral position, the pole 16 located at the locked position, as indicated by the phantom line, is distant from a second corner 24 between the outer arcuate wall 19 and the left cam wall 21. The pole 16 at the locked position just comes into contact with the left cam wall 21 when the output member 1 is turned counterclockwise from the neutral position to the AT cancelling point III as shown in FIG. 7. Therefore, even when the output member 1 is moved from the neutral position to the AT cancelling point III, the first lever 11 remains in the locked position. When the output member 1 is turned to the unlocking point IV beyond the AT cancelling point III as shown in FIG. 8, the left cam wall 21 pushes the pole 16 to thereby displace the first lever 11 into the unlocked position.

The actuator has a hollow second shaft 25 in which a small diameter shaft 27 formed in the top portion of the first shaft 9 is rotatably inserted. The second shaft 25 is coupled to a well-known inside locking button 26 of the door. A second lever 28 is formed integrally with the second shaft 25. A bifurcate portion 30 formed in an antitheft member 29 (hereunder often referred to as an AT member) is slidably engaged with the second lever 28. The AT member 29 and the inside locking button 26 are always connected with each other as the result of the engagement between the second lever 28 and the bifurcate portion 30. The AT member 29 has a hook 32 with which the box member 15 of the first lever 11is engageable. The hook 32 is communicated with the outside through an opening portion 31.

Figure 6:
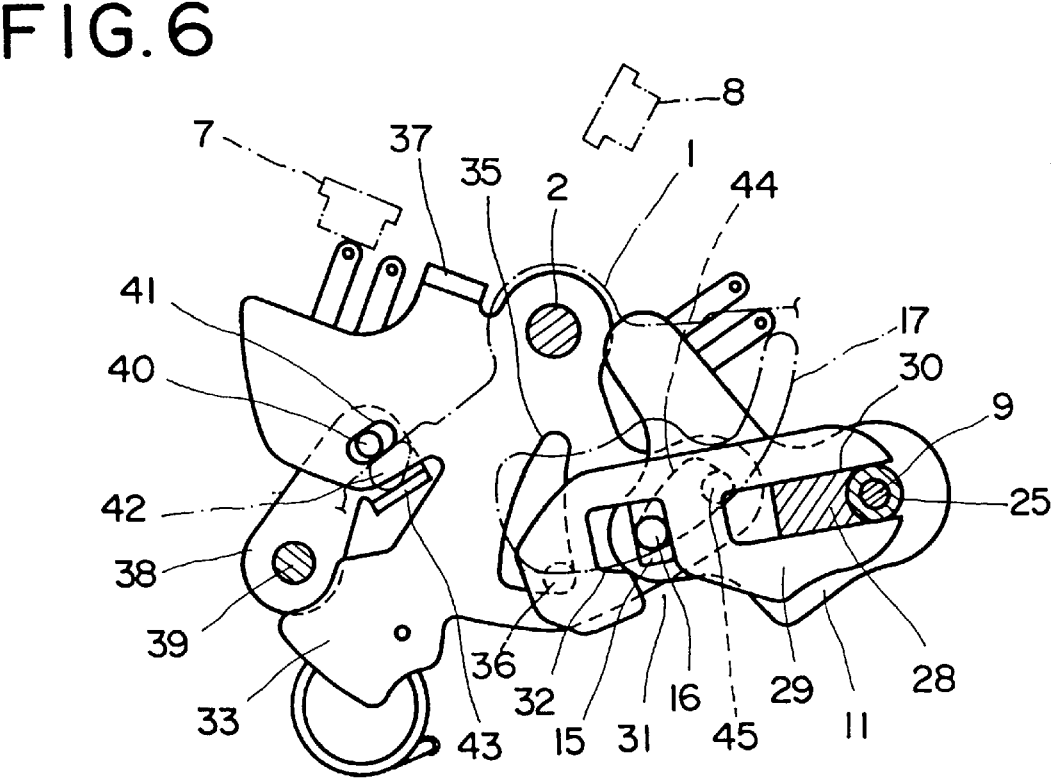
FIG. 6 is a view illustrating the output member which has been returned to a neutral position from a condition shown in FIG. 5.

The antitheft member 29 is slidable between an antitheft cancelling position (hereunder often referred to as an AT cancelling position) in which the box portion 15 of the first lever 11 is engaged with the hook 32 (FIG. 3) and an antitheft position (hereunder often referred to as an AT position) in which the box portion 15 is disengaged with the hook 32 (FIG. 6). When the AT member 29 is located at the AT cancelling position, the first lever 11 (or the locking lever 13) and the second lever (or the inside locking button 26) are connected with each other due to the engagement between the box member 15 and the hook 32. Thus, the state of the latch unit can be freely changed between the locked condition and the unlocked condition by manipulating the inside locking button 26. When the AT member 29 is located at the AT position, the box member 15 is disengaged with the hook 32 and faces the opening portion 31 as shown in FIG. 6. Therefore, the clockwise rotation of the AT member 29 by the inside locking button 26 cannot cause the first lever 11 to turn clockwise to the unlocked position. This swinging-and missing mechanism is an antitheft mechanism of the present invention.

Figure 3:
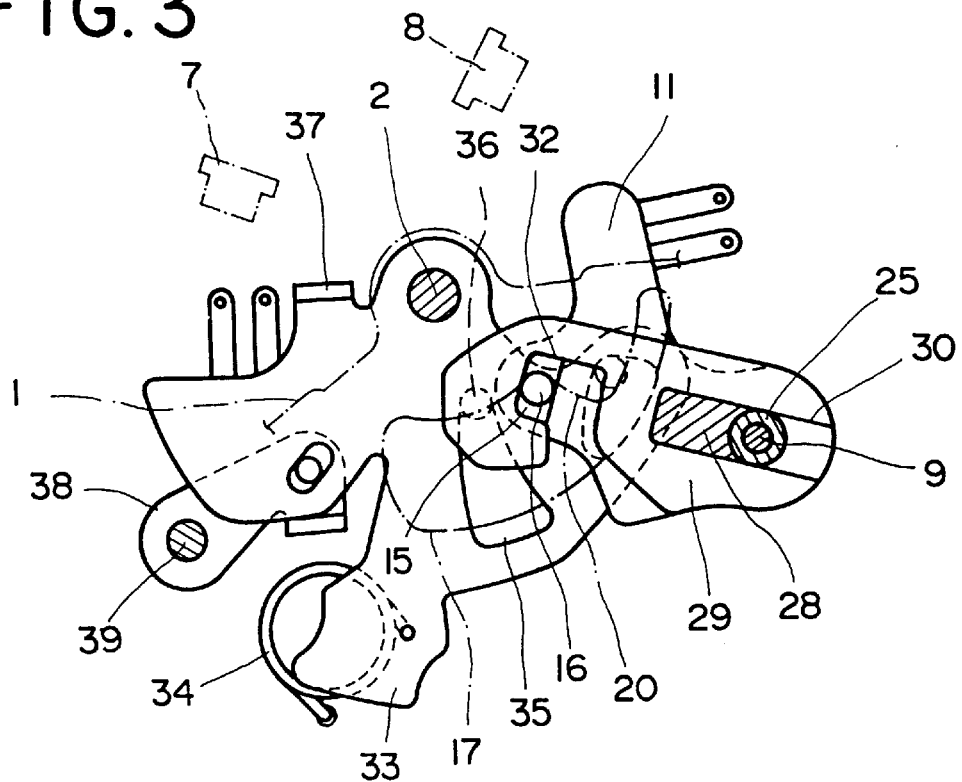
FIG. 3 is a view illustrating an output member at a neutral position, and a first lever and a second lever at unlocked positions.

A change-over member 33 for sliding the AT member 29 is provided below the first lever 11. The change-over member 33 is rotatably journalled to the shaft 2, and is preferably made of a thin metallic plate. The change-over member 33 is held at either a non-operative position shown in FIG. 3 or an operative position shown in FIG. 6 under the action of an over-center spring 34. The change-over member 33 is formed therein with a substantially triangular engaging hole 35 in which an engaging pin 36 formed on the AT member 29 is engaged. When the change-over member 33 is located at the non-operative position as shown in FIG. 3, the antitheft member 29 is held at the AT cancelling position due to the engagement between the engaging hole 35 and the engaging pin 36. However, when the change-over member 33 is displaced to the operative position over the dead point of the over-center spring 34, as shown in FIG. 6, the AT member 29 is slid to the left and is displaced to the AT position due to the engagement between the engaging hole 35 and the engaging pin 36.

The change-over member 33 is formed therein with an angle piece 37 which is engageable with one side face of the output member 1. The side face of the output member 1 is not brought into abutting engagement with the angle piece 37 even when the output member 1 is turned to the locking point I as illustrated in FIG. 4. The side face of the output member 1, however, pushes the angle piece 37 and changes the position of the change-over member 33 from the non-operative position to the operative position against the elasticity of the over-center spring 34 as illustrated in FIG. 5 if the output member 1 is turned to the AT point II beyond the locking point I. Thereby, the AT member 29 is displaced to the AT position.

To summarize the foregoing description of this embodiment briefly, in the case of the actuator of the present invention, when the output member 1 is turned to the locking point I as shown in FIG. 4, the first lever 11 (and the lock lever 13) is displaced to the locked position.

Further, when the output member 1 is turned to the AT point II beyond the locking point I, the AT member 29 is displaced to the AT position, but the first lever 11 remains in the locked position.

The actuator has a release lever 38 for returning the change-over member 33 to the non-operative position from the operative position by utilizing the power of the motor 4. The release lever 38 is rotatably journalled to a shaft 39. The lever 38 has a pin 40 which is engaged in an elongated hole 41 formed in the change-over member 33. The lever 38 further has an engaging piece 43 which is engageable with a protrusion 42 formed at the lower surface of the output member 1. The protrusion 42 makes contact with or is adjacent to the left side of the engaging piece 43 as shown in FIG. 6 when the output member 1 is located at the neutral position and the change-over member 33 is located at the operative position. In this condition, when the output member 1 is turned counterclockwise from the neutral position to the AT cancelling point III, the protrusion 42 pushes the engaging piece 43 and thus causes the release lever 38 to turn clockwise around the shaft 39. Then, the engagement between the hole 41 and pin 40 causes the change-over member 33 to turn counterclockwise and to be moved from the operative position to the non-operative position against the resilient force of the spring 34. Further, the position of the antitheft member 29 is changed from the AT position to the AT cancelling position. Thereby, the antitheft condition is cancelled. It is noted that even though the output member 1 is turned counterclockwise to the AT cancelling point III, the left cam wall 21 of the cam recess 17 does not push the pole 16 of the first lever 11, and the first lever 11 remains in the locked position. This is an operation of cancelling only the antitheft condition.

When the output member 1 is turned counterclockwise to the unlocking point IV beyond the AT cancelling point III, the left cam wall 21 pushes the pole 16 and thus causes the first lever 11 to turn clockwise. Thereby, the first lever 11 is displaced into the unlocked position.

The change-over member 33 has another triangular engaging hole 44 in which an engaging pin 45 formed on the first lever 11 is engaged. When the first lever 11 is turned clockwise to the unlocked position in the antitheft condition as shown in FIG. 6 by manipulating the key cylinder 14, the engaging pin 45 pushes the engaging hole 44 and thus causes the change-over member 33 to turn counterclockwise. Thereby, the change-over member 33 is displaced from the operative position into the non-operative position and the AT member 29 is returned to the AT cancelling position.

Figure 9:
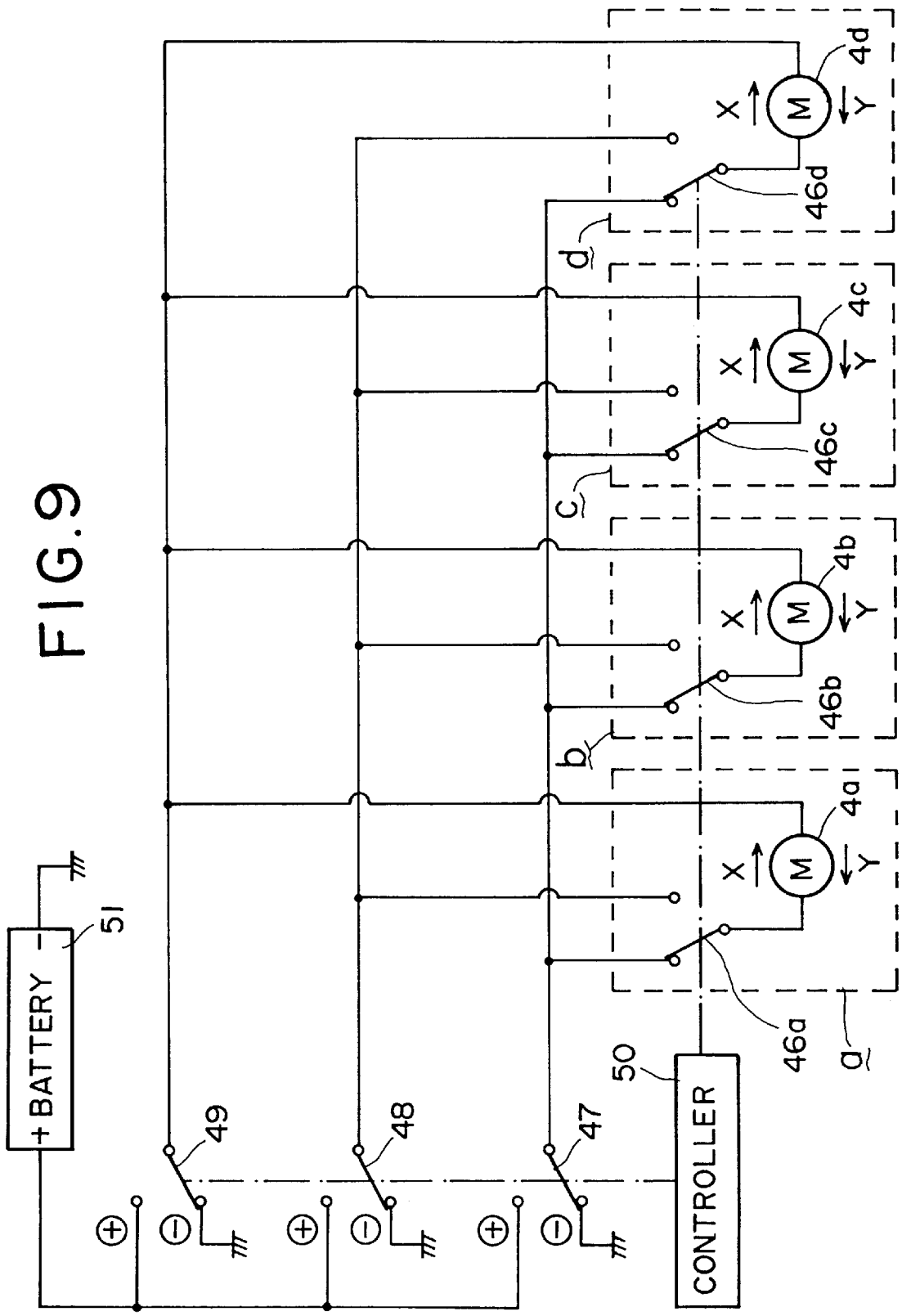
FIG. 9 is a circuit diagram of a power supply for an actuator.
Figure 10:
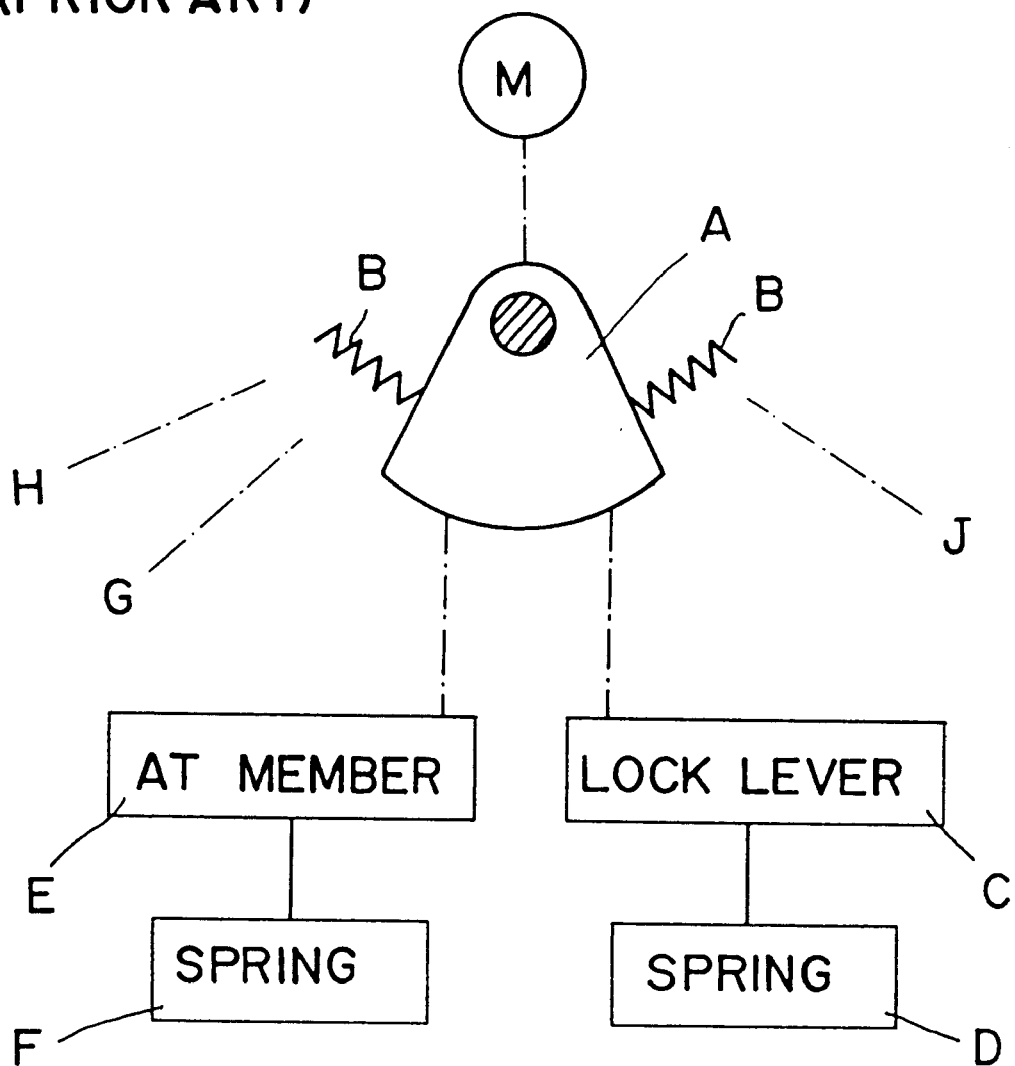
FIG. 10 is a view illustrating a well-known arrangement.

Usually, each of the vehicle doors has the door latch unit to which the above-mentioned actuator provided with the antitheft mechanism is attached. Referring to FIG. 9 which shows a circuit for supplying a power to the actuator of each door. A plurality of latch units mounted to the doors are indicated as a to d. First terminals of motors 4a to 4d are selectively connected to a first relay 47 or a second relay 48 through change-over switches 46a to 46d. Second terminals of the motors 4a to 4d are connected to a third relay 49. These three relays 47 to 49 are selectively controlled by a controller 50, independent from one another. The relays 47 to 49, in a stand-by mode, make contact with earth contacts which are connected to a negative electrode terminal of a battery 51.

Each of the motors 4a to 4d turns the corresponding one of the output members 1 clockwise in FIG. 1 when electric current flows in the direction of the arrow X. Conversely, when the current flows in the direction of the arrow Y, each of the motors 4a to 4d turns the corresponding one of the output members 1 counterclockwise.

Each of the switches 46a to 46d connects the corresponding one of the motors 4a to 4d with the first relay 47 when the corresponding one of the locking levers 13 of the latch units a to d is located in the unlocked position. Each of the switches 46a to 46d is changed so as to connect the corresponding one of the motors 4a to 4d with the second relay 48 when the corresponding one of locking levers 13 is changed into the locked position.

It is possible that each of the change-over switches 46a to 46d is changed so as to connect the corresponding one of the motors 4a to 4d with the second relay 48 when the corresponding one of the motors 4a to 4d rotates in normal direction by a predetermined amount or the corresponding one of the output members 1 is turned clockwise by a predetermined amount, and that each of the change-over switches 46a to 46d is changed so as to connect the corresponding one of the motors 4a to 4d with the first relay 47 when the corresponding one of the motors 4a to 4d rotates in reverse direction by a predetermined amount or the corresponding one of the output members 1 is turned counterclockwise by a predetermined amount.

OPERATION

When the controller 50 carries out antitheft operation, in the unlocked condition, for displacing the AT members 29 of the latch units a to d to the AT positions, the first and second relays 47 and 48 are connected to positive contacts. Then, at first, electric current flows in the direction of the arrow X through the first relay 47, and the motors 4a to 4d rotate in the normal directions to thereby turn the output members 1 clockwise toward the AT points II from the neutral positions, respectively.

When the output members 1 come to the locking points I (refer to FIG. 4), the first levers 11 are displaced to the locked positions, thereby the change-over switches 46a to 46d are changed and are connected to the second relay 48. At this time, since the second relay 48 is connected to the positive contacts, the current still flows through the motors 4a to 4d in the direction of the arrow X, thereby the output members 1 are turned clockwise beyond the locking points I to the AT points II, and the change-over members 33 are changed from the non-operative positions to the operative positions.

Thus, the AT members 29 are slid to the AT positions (refer to FIG. 5).

When the antitheft members 29 are changed into the AT positions, the motors 4a to 4d are not energized, and accordingly, the output members 1 are returned to the neutral positions by the resilient force of the springs 6 (refer to FIG. 6).

When the controller 50 carries out a locking operation, in the unlocked condition, for changing the first levers 11 into the locked positions, only the first relay 47 is connected to the positive contact. Then, current flows through the motors 4a to 4d in the direction of the arrow X through the first relay 47, and the motors 4a to 4d rotate in the normal directions to thereby turn the output members 1 clockwise toward the locking points I from the neutral positions, respectively. When the output members 1 reach the locking point I, the first levers 11 are changed into the locked positions, thereby the change-over switches 46a to 46d are changed and are connected to the negative electrode terminal of the battery 51 through the second relay 48. Thus, both contacts of each of the motors 4a to 4d are grounded, and the motors 4a to 4d serve as generators. Accordingly, the motors 4a to 4d are electrically braked, and surplus rotation of each of the output members 1 is reduced.

In the above-mentioned locking operation, some of the first levers 11 are changed quickly and some of the first levers 11 are changed slowly, due to difference among rotational speeds of the motors 4a to 4d and difference among frictional resistances of the components. It is very difficult to synchronize timing of the change-over of each first lever into the locked position. However, according to the present invention, the displacement of each of the first levers 11 to the lock position causes only the corresponding one of the change-over switch 46a to 46d to be changed over. Accordingly, the motors 4a to 4d are electrically braked with appropriate timings, respectively.

It is noted that the first to third relays 47 to 49 are connected to the battery 51 through a main switch which is not shown and which is controlled by the controller 50.

What is claimed is:

1. A vehicle door latch device comprising:
    a locking lever displaceable between a locked position and an unlocked position by manipulation of an inside locking button of a vehicle door;
    an antitheft member displaceable between an antitheft position for disabling an unlocking operation of the inside locking button and an antitheft cancelling position for enabling the unlocking operation of the inside locking button;
    a motor for changing the locking lever into the locked position by a predetermined amount of normal rotation thereof, and for changing the antitheft member into the antitheft position by a continuous normal rotation thereof beyond the predetermined amount;
    a controller for carrying out a locking operation for changing the locking lever into the locked position, and an antitheft operation for changing the antitheft member into the antitheft position; and
    a power supplying circuit controlled by the controller, and having a normal rotation circuit for supplying power to the motor for normal rotation, and a brake circuit for causing the motor to generate an electrical brake,
    wherein said motor is connected to the brake circuit after the locking lever is changed into the locked position by the locking operation.

2. A vehicle door latch device according to claim 1, wherein said power supplying circuit has a change-over switch displaceable between a normal rotation position for connecting the motor to the normal rotation circuit and a brake position for connecting the motor to the brake circuit.

3. A vehicle door latch device according to claim 2, wherein said change-over switch is displaced into the brake position from the normal rotation position when the locking lever is changed into the locked position from the unlocked position.

4. A vehicle door latch device according to claim 2, wherein said change-over switch is displaced into the brake position from the normal rotation position when the motor rotates in a normal direction after a predetermined amount.

5. A vehicle door latch device according to claim 2, wherein said power supplying circuit has a first relay which is connected to a positive electrode terminal of a battery during the locking operation and the antitheft operation, and a second relay which is connected to a negative electrode terminal of the battery during the locking operation and which is connected to the positive electrode terminal during the antitheft operation.

6. A vehicle door latch device comprising:
    a plurality of latch units attached respectively to a plurality of vehicle doors, each of the latch units including:
        a locking lever displaceable between a locked position and an unlocked position by manipulation of an inside locking button of a vehicle door;
        an antitheft member displaceable between an antitheft position for disabling an unlocking operation of the inside locking button and an antitheft cancelling position for enabling the unlocking operation of the inside locking button;
        a motor for changing the locking lever into the locked position after a predetermined amount of normal rotation thereof, and for changing the antitheft member into the antitheft position by a continuous normal rotation thereby beyond the predetermined amount;
    a controller for carrying out a locking operation for changing each said locking lever into the locked position, and an antitheft operation for changing each said antitheft member into the antitheft position; and
    a power supplying circuit controlled by the controller, and having a plurality of normal rotation circuits for respectively supplying power to each said motor for normal rotation, a plurality of brake circuits for respectively causing each said motor to generate an electrical brake, and a plurality of change-over switches respectively displaceable between a normal rotation position for connecting each said motor to a normal rotation circuit of said normal rotation circuits and a brake position for connecting each said motor to a brake circuit of said brake circuits, respectively,
    wherein each of said change-over switches is changed from the normal rotation position into the brake position when a corresponding locking lever is changed from the unlocked position into the locked position.

7. A vehicle door latch device according to claim 6, wherein each of said power supplying circuits has a first relay which is connected to a positive electrode terminal of a battery during the locking operation and the antitheft operation, and a second relay which is connected to a negative electrode terminal of the battery during the locking operation and which is connected to the positive electrode terminal during the antitheft operation.

* * * * *